(12) United States Patent
Corcoran et al.

(10) Patent No.: US 8,934,680 B2
(45) Date of Patent: *Jan. 13, 2015

(54) FACE TRACKING FOR CONTROLLING IMAGING PARAMETERS

(71) Applicant: DigitalOptics Corporation Europe Limited, Galway (IE)

(72) Inventors: Peter Corcoran, Claregalway (IE); Eran Steinberg, San Francisco, CA (US); Petronel Bigioi, Galway (IE)

(73) Assignee: Fotonation Limited, Ballybrit, Galaway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,061

(22) Filed: Feb. 19, 2013

(65) Prior Publication Data

US 2013/0223698 A1  Aug. 29, 2013

Related U.S. Application Data

(63) Continuation of application No. 12/814,245, filed on Jun. 11, 2010, now Pat. No. 8,385,610, which is a continuation of application No. 12/479,593, filed on Jun. 5, 2009, now Pat. No. 7,916,897, which is a (Continued)

(51) Int. Cl.
*G06K 9/00* (2006.01)
*G06T 7/20* (2006.01)
*G06K 9/34* (2006.01)
*G06K 9/32* (2006.01)

(52) U.S. Cl.
CPC ........ *G06K 9/00288* (2013.01); *G06K 9/00228* (2013.01); *G06T 7/204* (2013.01); *G06T 7/2046* (2013.01); *G06K 2009/3291* (2013.01); *G06T 2207/10016* (2013.01); *G06T 2207/20016* (2013.01); *G06T 2207/30201* (2013.01)
USPC .......................................... 382/118; 382/103

(58) Field of Classification Search
USPC ................. 382/103, 118, 164, 165, 167, 199; 348/199, 222.1, 223.1, 224.1, 239, 348/361, 363, 345, 349, 370, 371, 655, 348/E9.051, E5.02; 358/2.1, 504, 516
See application file for complete search history.

(56) References Cited

U.S. PATENT DOCUMENTS

| | | | | |
|---|---|---|---|---|
| 4,047,187 | A | * | 9/1977 | Mashimo et al. ............. 396/100 |
| 4,317,991 | A | * | 3/1982 | Stauffer ..................... 250/201.4 |
| 4,367,027 | A | * | 1/1983 | Stauffer ........................ 396/144 |
| 4,448,510 | A | * | 5/1984 | Murakoshi ...................... 396/53 |

(Continued)

OTHER PUBLICATIONS

Non-Final Rejection, dated Jan. 23, 2013, for U.S. Appl. No. 13/245,738, filed Sep. 26, 2011.

(Continued)

*Primary Examiner* — Amir Alavi
(74) *Attorney, Agent, or Firm* — Hickman Palermo Truong Becker Bingham Wong LLP

(57) ABSTRACT

A method of tracking faces in an image stream with a digital image acquisition device includes receiving images from an image stream including faces, calculating corresponding integral images, and applying different subsets of face detection rectangles to the integral images to provide sets of candidate regions. The different subsets include candidate face regions of different sizes and/or locations within the images. The different candidate face regions from different images of the image stream are each tracked.

30 Claims, 5 Drawing Sheets

Related U.S. Application Data continuation-in-part of application No. 12/141,042, filed on Jun. 17, 2008, now Pat. No. 7,620,218, application No. 13/771,061, which is a continuation-in-part of application No. 12/063,089, filed on Feb. 6, 2008, now Pat. No. 8,055,029, which is a continuation-in-part of application No. 11/766,674, filed on Jun. 21, 2007, now Pat. No. 7,460,695, which is a continuation of application No. 11/753,397, filed on May 24, 2007, now Pat. No. 7,403,643, which is a continuation-in-part of application No. 11/464,083, filed on Aug. 11, 2006, now Pat. No. 7,315,631.

(60) Provisional application No. 60/945,558, filed on Jun. 21, 2007.

(56) References Cited

U.S. PATENT DOCUMENTS

| | | | |
|---|---|---|---|
| 4,638,364 A * | 1/1987 | Hiramatsu | 348/356 |
| 4,796,043 A * | 1/1989 | Izumi et al. | 396/121 |
| 4,970,663 A * | 11/1990 | Bedell et al. | 382/232 |
| 4,975,969 A * | 12/1990 | Tal | 382/116 |
| 5,008,946 A * | 4/1991 | Ando | 382/104 |
| 5,018,017 A * | 5/1991 | Sasaki et al. | 348/231.3 |
| 5,164,992 A | 11/1992 | Turk et al. | |
| 5,430,809 A | 7/1995 | Tomitaka | |
| 5,771,307 A | 6/1998 | Lu et al. | |
| 5,774,591 A | 6/1998 | Black et al. | |
| 5,912,980 A | 6/1999 | Hunke | |
| 6,121,953 A | 9/2000 | Walker | |
| 6,184,926 B1 | 2/2001 | Khosravi et al. | |
| 6,188,777 B1 | 2/2001 | Darrell et al. | |
| 6,404,900 B1 | 6/2002 | Qian et al. | |
| 6,611,613 B1 | 8/2003 | Kang et al. | |
| 6,681,032 B2 | 1/2004 | Bortolussi et al. | |
| 7,120,279 B2 | 10/2006 | Chen et al. | |
| 7,194,114 B2 | 3/2007 | Schneiderman | |
| 7,315,631 B1 * | 1/2008 | Corcoran et al. | 382/118 |
| 7,403,643 B2 | 7/2008 | Ianculescu et al. | |
| 7,460,694 B2 | 12/2008 | Corcoran et al. | |
| 7,460,695 B2 * | 12/2008 | Steinberg et al. | 382/118 |
| 7,469,055 B2 | 12/2008 | Corcoran et al. | |
| 7,620,218 B2 | 11/2009 | Steinberg et al. | |
| 7,864,990 B2 | 1/2011 | Corcoran et al. | |
| 7,916,182 B2 | 3/2011 | Itoh | |
| 7,916,897 B2 | 3/2011 | Corcoran et al. | |
| 8,050,465 B2 | 11/2011 | Ianculescu et al. | |
| 8,055,029 B2 | 11/2011 | Petrescu et al. | |
| 8,149,324 B2 | 4/2012 | Oikawa | |
| 8,155,397 B2 | 4/2012 | Bigioi et al. | |
| 8,159,599 B2 | 4/2012 | Takamiya | |
| 8,160,310 B2 | 4/2012 | Takayama | |
| 8,189,927 B2 | 5/2012 | Steinberg et al. | |
| 8,379,917 B2 | 2/2013 | Bigioi et al. | |
| 8,385,610 B2 * | 2/2013 | Corcoran et al. | 382/118 |
| 2001/0000025 A1 | 3/2001 | Darrell et al. | |
| 2003/0133600 A1 | 7/2003 | Huang et al. | |
| 2006/0029265 A1 | 2/2006 | Kim et al. | |
| 2007/0013791 A1 | 1/2007 | Kinoshita et al. | |
| 2007/0076921 A1 | 4/2007 | Living | |
| 2007/0098218 A1 | 5/2007 | Zhang et al. | |
| 2007/0110305 A1 | 5/2007 | Corcoran et al. | |
| 2007/0160307 A1 | 7/2007 | Steinberg et al. | |
| 2007/0201725 A1 | 8/2007 | Steinberg et al. | |
| 2007/0201726 A1 | 8/2007 | Steinberg et al. | |
| 2007/0269108 A1 | 11/2007 | Steinberg et al. | |
| 2008/0013799 A1 | 1/2008 | Steinberg et al. | |
| 2008/0219518 A1 | 9/2008 | Steinberg et al. | |
| 2008/0220750 A1 | 9/2008 | Steinberg et al. | |
| 2008/0316327 A1 | 12/2008 | Steinberg et al. | |
| 2008/0316328 A1 | 12/2008 | Steinberg et al. | |
| 2009/0002514 A1 | 1/2009 | Steinberg et al. | |
| 2009/0003708 A1 | 1/2009 | Steinberg et al. | |
| 2009/0028394 A1 | 1/2009 | Hosoi et al. | |
| 2009/0052749 A1 | 2/2009 | Steinberg et al. | |
| 2009/0052750 A1 | 2/2009 | Steinberg et al. | |
| 2009/0087030 A1 | 4/2009 | Steinberg et al. | |
| 2009/0087042 A1 | 4/2009 | Steinberg et al. | |
| 2009/0141144 A1 | 6/2009 | Steinberg | |
| 2009/0141974 A1 | 6/2009 | Ono | |
| 2009/0179998 A1 | 7/2009 | Steinberg et al. | |
| 2009/0208056 A1 | 8/2009 | Corcoran et al. | |
| 2009/0238410 A1 | 9/2009 | Corcoran et al. | |
| 2009/0238419 A1 | 9/2009 | Steinberg et al. | |
| 2009/0303342 A1 | 12/2009 | Corcoran et al. | |
| 2009/0324008 A1 | 12/2009 | Kongqiao et al. | |
| 2010/0014721 A1 | 1/2010 | Steinberg et al. | |
| 2010/0039525 A1 | 2/2010 | Steinberg et al. | |
| 2010/0054533 A1 | 3/2010 | Steinberg et al. | |
| 2010/0054549 A1 | 3/2010 | Steinberg et al. | |
| 2010/0060727 A1 | 3/2010 | Steinberg et al. | |
| 2010/0066822 A1 | 3/2010 | Steinberg et al. | |
| 2010/0092039 A1 | 4/2010 | Steinberg et al. | |
| 2011/0026780 A1 | 2/2011 | Corcoran et al. | |
| 2011/0157370 A1 | 6/2011 | Livesey | |

OTHER PUBLICATIONS

Notice of Allowance, dated Mar. 5, 2013, for U.S. Appl. No. 13/234,149, filed Sep. 15, 2011.

Notice of Allowance, dated Jan. 18, 2013, for U.S. Appl. No. 12/814,245, filed Jun. 11, 2010.

Non-Final Rejection, dated Apr. 24, 2013, for U.S. Appl. No. 13/753,425, filed Jan. 29, 2013.

Notice of Allowance, dated May 10, 2013, for U.S. Appl. No. 12/619,587, filed Nov. 16, 2009.

Lerdsudwichai C, Abdel-Mottaleb M, Ansari A N: "Tracking multiple people with recovery from partial and total occlusion" Pattern Recognition, Elsevier, GB, LNKD-DOI:10.1016/J.PATCOG.2004.11.022, vol. 38, No. 7, Jul. 1, 2005, pp. 1059-1070, XP004850475 ISSN: 0031-3203; DOI:http://dx.doi.org/10.1016/j.patcog.2004.11.022.

Xuefeng Song, Nevatia R: "Combined face-body tracking in indoor environment", Pattern Recognition, 2004. ICPR 2004. Proceedings of the 17th International Conference on Cambridge, UK, Aug. 23-26, 2004, Piscataway, NJ, USA, IEEE, Los Alamitos, CA, USA, LNKD-DOI:10.1109/ICPR.2004.1333728, vol. 4, Aug. 23, 2004, pp. 159-162, XP010723886 ISBN: 978-0-7695-2128-2; DOI:http://dx.doi.org/10.1109/ICPR.2004.1333728.

Mark Everingham, Josef Sivic and Andrew Zisserman: "Hello! My name is . . . Buffy Automatic Naming of Characters in TV Video", Proceedings of the British Machine Vision Conference (2006), Jan. 1, 2006, pp. 1-10, XP009100754.

Yang M. et al.: "Detection Driven Adaptive Multi-cue Integration for Multiple Human Tracking" IEEE 12th International Conference on Computer Vision (ICCV), Sep. 30, 2009, pp. 1554-1561, XP002607967.

Hied T Nguyen, Arnold W M Smeulders: "Robust Tracking Using Foreground-Background Texture Discrimination" International Journal of Computer Vision, Kluwer Academic Publishers, Bo LNKD-DOI:10.1007/S11263-006-7067-X, vol. 69, No. 3, May 1, 2006, pp. 277-293, XP019410143 ISSN: 1573-1405; DOI:http://dx.doi.org/10.1007/s11263-006-7067.

Gaël Jaffré, Philippe Joly: "Improvement of a Person Labelling Method Using Extracted Knowledge on Costume", 11th international conference, CAIP 2005, Versailles, France, Sep. 5-8, 2005; proceedings; Jan. 1, 2005, Computer Analysis of Images and Patterns, Lecture Notes in Computer Science; LNCS, Springer, Berlin, DE, p. 489-497, XP019019231, ISBN: 978-3-540-28969-2.

* cited by examiner

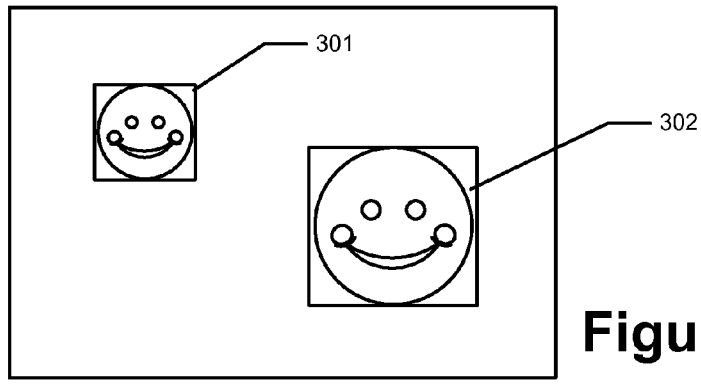
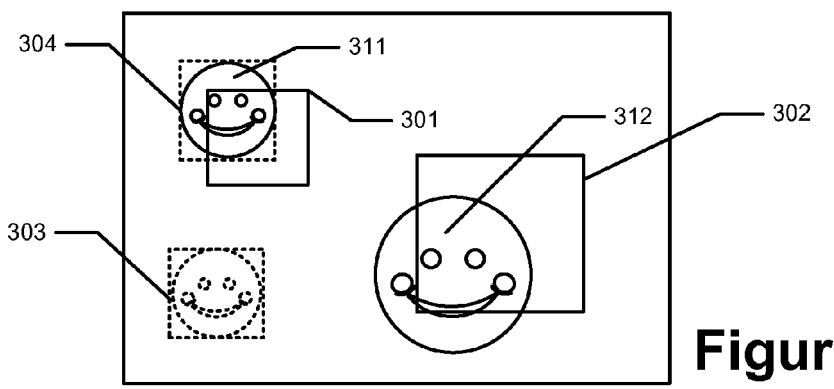
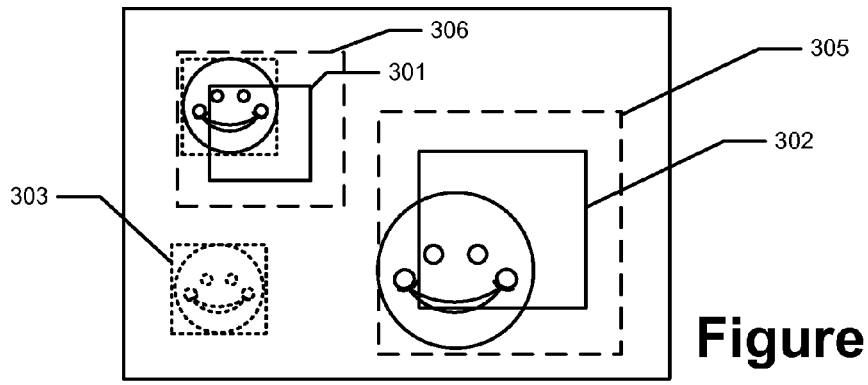
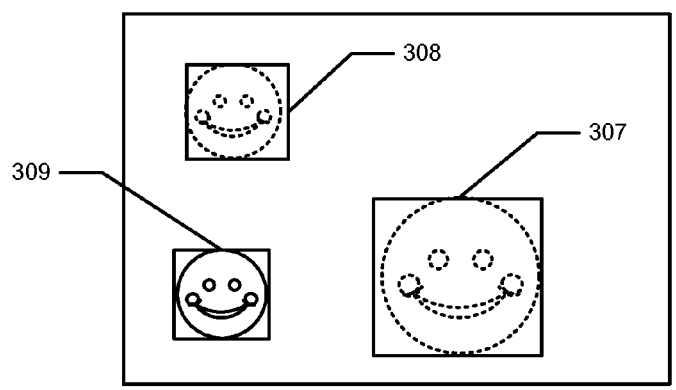
Figure 3(a)
Figure 3(b)
Figure 3(c)
Figure 3(d)

| | |
|---|---|
| FRAME 1 | INTEGRAL IMAGE ON 160X120 (WILL BE STORED FOR 5 FRAMES)<br><br>SCALES:<br>67X67 & 59X59<br>53X53 & 48X48<br>44X44 & 39X39 |
| FRAME 2 | SCALES:<br>35X35 & 28X28 |
| FRAME 3 | SCALE:<br>22X22 & 17X17 (1/3 FROM THE FRAME) |
| FRAME 4 | SCALE:<br>22X22 & 17X17 (1/3 FROM THE FRAME) |
| FRAME 5 | SCALE:<br>22X22 & 17X17 (1/3 FROM THE FRAME) |

Figure 4

FACE TRACKING FOR CONTROLLING IMAGING PARAMETERS

PRIORITY AND RELATED APPLICATIONS

This application is a continuation of U.S. patent application Ser. No. 12/814,245, filed Jun. 11, 2010, now U.S. Pat. No. 8,385,610; which is a continuation of U.S. patent application Ser. No. 12/479,593, filed Jun. 5, 2009, now U.S. Pat. No. 7,916,897; which is a continuation-in-part (CIP) of U.S. patent application Ser. No. 12/141,042, filed Jun. 17, 2008, now U.S. Pat. No. 7,620,218; which claims priority to U.S. Ser. No. 60/945,558, filed Jun. 21, 2007; and which is a CIP of U.S. Ser. No. 12/063,089, filed Feb. 6, 2008, now U.S. Pat. No. 8,055,029; which is a CIP of U.S. Ser. No. 11/766,674, filed Jun. 21, 2007, now U.S. Pat. No. 7,460,695; which is a CIP of U.S. Ser. No. 11/753,397, filed May 24, 2007, now U.S. Pat. No. 7,403,643; which is a CIP of U.S. Ser. No. 11/464,083, filed Aug. 11, 2006, now U.S. Pat. No. 7,315,631; and this application is related to Ser. No. 11/765,212, filed Jun. 19, 2007, now U.S. Pat. No. 7,460,694; and Ser. No. 11/765,307, filed Jun. 19, 2007, now U.S. Pat. No. 7,469,055; and Ser. No. 12/333,221, filed Dec. 11, 2008, now U.S. Pat. No. 7,864,990; and Ser. No. 12/167,500, filed Jul. 3, 2008, now U.S. Pat. No. 8,050,465; and Ser. No. 12/042,104, filed Mar. 4 2008, now U.S. Pat. No. 8,189,927; and Ser. No. 11/861,854, filed Sep. 26, 2007, now U.S. Pat. No. 8,155,397; which are all assigned to the same assignee as the present application and hereby incorporated by reference.

BACKGROUND

1. Field of the Invention

The present invention provides an improved method and apparatus for image processing in acquisition devices. In particular the invention provides improved real-time face tracking in a digital image acquisition device.

2. Description of the Related Art

Face tracking in digital image acquisition devices includes methods of marking human faces in a series of images such as a video stream or a camera preview. Face tracking can be used to indicate to a photographer the locations of faces in an image, thereby improving acquisition parameters, or allowing post processing of the images based on knowledge of the locations of the faces.

In general, face tracking systems employ two principle modules: (i) a detection module for locating new candidate face regions in an acquired image or a sequence of images; and (ii) a tracking module for confirming face regions.

A well-known fast-face detection algorithm is disclosed in US 2002/0102024, hereinafter referred to as "Viola-Jones", which is hereby incorporated by reference. In brief, Viola-Jones first derives an integral image from an acquired image, which is usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also, intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image, this sub-window is shifted incrementally across the integral image until the entire image has been covered.

In addition to moving the sub-window across the entire integral image, the sub window is also scaled up/down to cover the possible range of face sizes. In Viola-Jones, a scaling factor of 1.25 is used and, typically, a range of about 10-12 different scales are used to cover the possible face sizes in an XVGA size image.

The resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than previous face detectors, it still involves significant computation and a Pentium-class computer can only just about achieve real-time performance. In a resource-restricted embedded system, such as a hand held image acquisition device, e.g., a digital camera, a hand-held computer or a cellular phone equipped with a camera, it is generally not practical to run such a face detector at real-time frame rates for video. From tests within a typical digital camera, it is possible to achieve complete coverage of all 10-12 sub-window scales with a 3-4 classifier cascade. This allows some level of initial face detection to be achieved, but with undesirably high false positive rates.

In US 2005/0147278, by Rui et al., which is hereby incorporated by reference, a system is described for automatic detection and tracking of multiple individuals using multiple cues. Rui et al. disclose using Viola-Jones as a fast face detector. However, in order to avoid the processing overhead of Viola-Jones, Rui et al. instead disclose using an auto-initialization module which uses a combination of motion, audio and fast face detection to detect new faces in the frame of a video sequence. The remainder of the system employs well-known face tracking methods to follow existing or newly discovered candidate face regions from frame to frame. The method described by Rui et al. involves some video frames being dropped in order to run a complete face detection process.

U.S. Pat. No. 6,940,545 to Ray et al., which is incorporated by reference, describes the use of face detection to adjust various camera parameters including Auto-Focus (AF), Auto-Exposure (AE), Auto White Balance (AWB) and Auto Color Correction (ACC). The detection algorithm employed by Ray et al. is a two part algorithm wherein the first stage is fast, but exhibits a high false positive rate and the second stage is more accurate but requires significantly more processing time.

In particular, Ray et al state that the face detector must operate on an image in a timeframe of less than one second (col. 10, line 57) although they do not specify if this timeframe is for the combination of fast and accurate detectors or is a limit on the fast detector only. Where a detection or combined detection/tracking algorithm is applied to preview images in a state-of-art camera, it typically operates on a timeframe of 20-30 ms in order to be compatible with preview frame rates of 30-50 fps. This is a significantly faster requirement than any capability specified in Ray et al.

Ray et al also describe the use of a "framing image" (e.g. FIG. 3), which may be deemed somewhat analogous to a preview image within a state-of-art camera. However, the concept of tracking face regions from frame to frame within a stream (or collection) of (low-resolution) preview images is not described by Ray et al. Also, U.S. Pat. No. 7,269,292, which is incorporated by reference, contains the concept of tracking a face region within a collection of low resolution images and using this information to selectively adjust image compression.

Disadvantages of the processes described by Ray et al., include the following: First, using a color based fast face detector is actually quite unreliable as many backgrounds and scene objects can be confused with skin colors. Second, the face detector of Ray et al. is applied to an entire scene before any additional processing occurs. This can lead to a time lag of one second plus the time to implement processes such as auto-focus, auto-exposure or auto white balance. Third, Ray et al. only described to adjust camera parameters responsive to a user activating an acquisition, whereas in a practical camera it is desirable to constantly adjust exposure, focus and color balance based on each frame of a preview stream. Fourth, where image acquisition is asynchronous with respect to the preview stream, then Ray et al. apply face tracker processing to the current frame completely before the rest of the method described by Ray et al. is applied.

SUMMARY OF THE INVENTION

A method of acquiring an improved image based on tracking a face in a preview image stream with a digital image acquisition device is provided. An initial location and/or size of a face is/are determined in a first preview image of a preview image stream. A subsequent location and/or size for the same face is determined in a subsequent preview image. Based on the initial and subsequent locations and/or sizes, or combinations thereof, the method further includes predicting a region within a third preview image which has just been acquired within which region the same face is expected to occur again. One or more characteristics of the region of the third preview image are analyzed. Based on the analyzing, one or more acquisition parameters of a main acquired image are adjusted, for example, white balance, color balance, focus and/or exposure. The one or more analyzed characteristics of the region may include sharpness, luminance, texture, color histogram, luminance histogram, horizontal luminance profile, vertical luminance profile, horizontal chrominance profile, vertical chrominance profile, or region correlogram, or combinations thereof. The preview and main acquired images may have different resolutions.

A further method of tracking faces in an image stream with a digital image acquisition device is provided. According to one aspect, a first image is received from an image stream including one or more face regions. A corresponding first integral image is calculated for at least a portion of the first image or a sub-sampled version or a combination thereof. A first subset of face detection windows, such as rectangles or other shapes, is applied to the first integral image to provide a first set of candidate face regions each having a given size and a respective location. A second image is received from the image stream including the one or more face regions, wherein the second image includes substantially a same scene as the first image. A corresponding second integral image is calculated for at least a portion of the second image or a subsampled version or a combination thereof. A second subset of face detection windows is applied to the second integral image to provide a second set of candidate face regions each also having a given size and a respective location. The second subset includes one or more different face detection windows than the first subset, and the first and second subsets include one or more candidate face regions of different sizes or locations or both. The process further includes tracking the candidate face regions of different sizes or locations, or both, of the first and second images from the image stream.

A further method is provided for tracking faces in an image stream with a digital image acquisition device. Digital images are received from an image stream including faces. Corresponding integral images are calculated for the digital images. Different subsets of face detection windows are applied to different subsets of the integral images to provide different sets of candidate face regions of different sizes or locations or both within the digital images. Each of the different candidate face regions is tracked within further images of the image stream and/or a main target image with which the image stream is utilized.

The first and second sets of candidate face regions may be merged with one or more previously detected face regions to provide a merged set of candidate face regions of different sizes or locations or both. The at least one previously detected face region may include a set of confirmed face regions for one or more previously acquired images.

Variable-sized face detection may be applied to one or more of the face regions of the merged set of candidate face regions to provide a set of confirmed face regions and a set of rejected face regions. The applying of variable sized face detection may include applying cascades of Haar classifiers of varying size to integral images of face candidate regions of the merged set.

The applying of the first and second subsets of face detection windows may include applying fixed-size face detection. The applying of fixed size face detection may include applying a cascade of Haar classifiers of a fixed size to integral images of face candidate regions of the merged set.

The method may also include checking a rejected face region based on alternative criteria from the fixed and variable sized face detection. Responsive to the checking, an indication may be provided that the rejected face region is actually a face region. That previously rejected face region is then added to the set of confirmed face regions. The checking may include applying a skin prototype to a rejected face region.

Responsive to the first image being captured with a flash, one or more tracked regions of the first integral image may be analyzed for red-eye defect. The red eye defect may be corrected in the first integral image and/or an indication of red eye defect may be stored with the first integral image.

The method may include repeating the receiving, calculating and applying for one or more further images, including applying one or more further subsets of face detection windows to one or more further integral images to provide one or more further sets of candidate face regions each having a given size and a respective location. The one or more further subsets would include different face detection windows than the first and second subsets, such that the first, second and one more further subsets respectively include candidate face regions of different sizes or locations or both.

A digital image acquisition device is also provided that includes a lens, an image sensor, a processor, and a processor readable memory having code embedded therein for programming the processor to perform any of the methods described herein.

One or more computer-readable storage devices are also provided that have computer readable code embedded therein for programming one or more processors to perform any of the methods described herein.

BRIEF DESCRIPTION OF THE DRAWINGS

Embodiments of the invention will now be described by way of example, with reference to the accompanying drawings, in which:

FIGS. 3(a) to 3(d) illustrate examples of images processed by an apparatus in accordance with certain embodiments.

FIG. 4 illustrates a distribution of face detection over two or more frames, e.g., five frames, under certain example conditions.

DETAILED DESCRIPTIONS OF THE EMBODIMENTS

Figure 1:
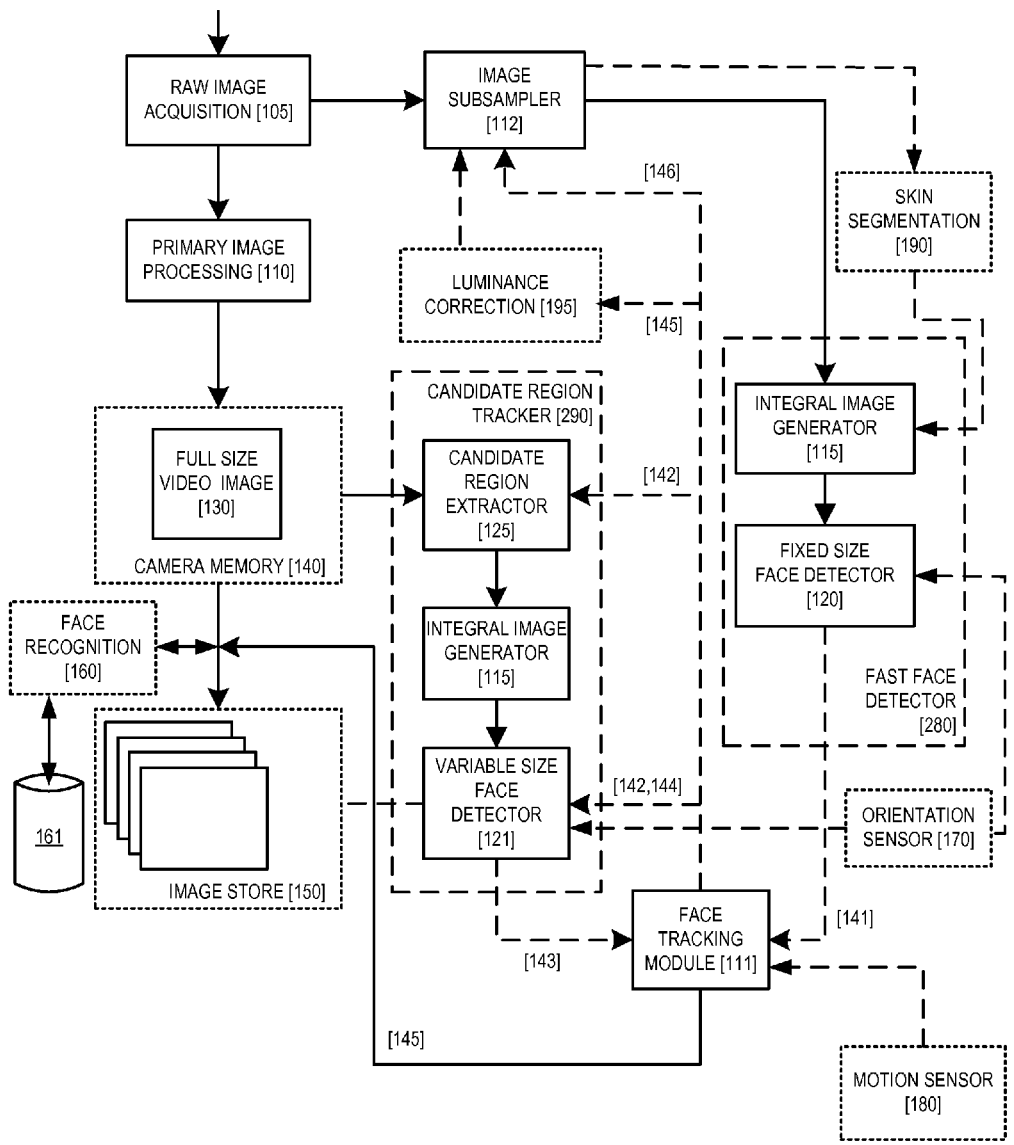
FIG. 1 is a block diagram illustrating principle components of an image processing apparatus in accordance with certain embodiments.

Methods are provided for detecting, tracking or recognizing faces, or combinations thereof, within acquired digital images of an image stream. An image processing apparatus is also provided including one or more processors and one or more digital storage media having digitally-encoded instructions embedded therein for programming the one or more processors to perform any of these methods.

A first method is provided for tracking faces in an image stream with a digital image acquisition device. In one embodiment, an acquired image is received from an image stream including one or more face regions. The acquired image is sub-sampled at a specified resolution to provide a sub-sampled image. A corresponding integral image is calculated for a least a portion of the sub-sampled image. A fixed size face detection is applied to at least a portion of the integral image to provide a set of one or more candidate face regions each having a given size and a respective location. Responsive to the given size and respective location of the candidate face regions, and optionally including one or more previously detected face regions, adjusting a resolution at which a next acquired image is sub-sampled.

In certain embodiments, calculations are avoided of a complete highest resolution integral image for every acquired image in an image stream, thereby reducing integral image calculations in an advantageous face tracking system. This either reduces processing overhead for face detection and tracking or allows longer classifier chains to be employed during the frame-to-frame processing interval to provide higher quality results, and either way providing enhanced face tracking. This can significantly improve the performance and/or accuracy of real-time face detection and tracking.

In certain embodiments, when implemented in an image acquisition device during face detection, a subsampled copy of an acquired image may be extracted from the camera hardware image acquisition subsystem and the integral image may be calculated for this subsampled image. During face tracking, the integral image may be calculated for an image patch surrounding each candidate region, rather than the entire image.

In such an implementation, the process of face detection may be spread across multiple frames. This approach is advantageous for effective implementation. In one example, digital image acquisition hardware is designed to subsample to a single size. This aspect takes advantage of the fact that when composing a picture, a face will typically be present for multiple frames within video sequences. Significant improvements in efficiency are provided, while the reduction in computation does not impact very significantly on the initial detection of faces.

In certain embodiments, the 3-4 smallest sizes (lowest resolution) of subsampled images are used in cycle. In some cases, such as when the focus of the camera is set to infinity, larger image subsamples may be included in the cycle as smaller (distant) faces may occur within the acquired image (s). In yet another embodiment, the number of subsampled images may change based on the estimated potential face sizes based on the estimated distance to the subject. Such distance may be estimated based on the focal length and focus distance, these acquisition parameters may be available from other subsystems within the imaging appliance firmware.

By varying the resolution/scale of the sub-sampled image which is in turn used to produce the integral image, a single fixed size of classifier can be applied to the different sizes of integral image. Such an approach is particularly amenable to hardware embodiments where the subsampled image memory space can be scanned by a fixed size direct memory access (DMA) window and digital logic to implement a Haar-feature classifier chain can be applied to this DMA window. However, it will be seen that several sizes of classifier (in a software embodiment), or multiple fixed-size classifiers (in a hardware embodiment) could also be used.

A key advantage of this aspect is that from frame to frame the calculation involves a low resolution integral image. This is particularly advantageous when working with a consumer digital image acquisition device such as a portable camera or camera phone.

A full resolution image patch surrounding each candidate face region may be acquired prior to the acquisition of the next image frame. An integral image may then be calculated for each such image patch and a multi-scaled face detector may be applied to each such image patch. Regions which are found by the multi-scaled face detector to be face regions are referred to as confirmed face regions.

This aspect advantageously avoids involvement of motion and audio queues such as those favored by Rui, and allows significantly more robust face detection and tracking to be achieved in a digital camera, particularly a portable camera, camera-phone or camera-enabled embedded device.

In accordance with certain embodiments, a face detection and recognition method is also provided. In these embodiments, an acquired image is received from an image stream including one or more face regions. The acquired image is sub-sampled at a specified resolution to provide a first-sub-sampled image. An integral image is calculated for at least a portion of the sub-sampled image. Face detection is applied to at least a portion of the integral image to provide a set of one or more candidate face regions each including a given size and a respective location. Using a database, face recognition is selectively applied to one or more candidate face regions to provide an identifier for a recognized face. The identifier is stored for the recognized face in association with at least one image from the image stream.

In certain embodiments, when face tracking detects a face region from a stream of images, the acquisition device firmware runs a face recognition algorithm at the location of the face using a database preferably stored on the acquisition device comprising personal identifiers and their associated face parameters.

This feature mitigates problems of algorithms that use a single image for face detection and recognition which have lower probability of performing correctly.

In certain embodiments, an orientation of a digital image acquisition device is determined for at least one acquired image of an image stream. Face detection is applied to at least a portion of the acquired image to provide a set of one or more candidate face regions according to the determined orientation, and each candidate face region has a given size and a respective location.

In certain embodiments, the acquisition device includes an orientation sensor which indicates the likely orientation of faces in acquired images. The determined camera orientation is fed to face detection processes which then apply face detection for the likely orientation of faces. This improves processing requirements and/or face detection accuracy.

According to another embodiment, a further method is provided for tracking faces in an image stream using a digital image acquisition device. An acquired image may be received from an image stream including one or more face regions. An indication of relative movement of the acquired image relative to a previously acquired image is also received. The previously acquired image includes an associated set of candidate face regions having a given size and a respective location. Adjusted face detection is applied to at least a portion of the acquired image in the vicinity of the candidate face regions as a function of the movement to provide an updated set of candidate face regions.

A face tracking module in accordance with this feature improves performance, as it employs a motion sensor subsystem to indicate to the face tracking module large motions of the acquisition device during a face tracking sequence.

Without such an advantageous sensor, where the acquisition device is suddenly moved by a user rather than slowly panned across a scene, candidate face regions in the subsequent frames of a video sequence may be displaced beyond the immediate vicinity of the corresponding candidate region in the previous video frame, causing the face tracking module to fail to track the face such that the process then involves re-detection of the candidate.

In certain embodiments, a method and apparatus are provided for detecting faces in an image stream using a digital image acquisition device. In these embodiments, an acquired image is received from an image stream including one or more face regions. An acquired image is sub-sampled at a specified resolution to provide a sub-sampled image. One or more regions of said acquired image are identified that predominantly include skin tones. A corresponding integral image is calculated for a least one of the skin tone regions of the sub-sampled acquired image. Face detection is applied to at least a portion of the integral image to provide a set of one or more candidate face regions each having a given size and a respective location.

By only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection involved in positively detecting a face.

FIG. 1 shows the primary subsystems of a face tracking system in accordance with a preferred embodiment. The solid lines indicate the flow of image data; the dashed line indicates control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image is acquired in raw format from an image sensor (CCD or CMOS) [105] and an image subsampler [112] generates a smaller copy of the main image. Most digital cameras already contain dedicated hardware subsystems to perform image subsampling, for example to provide preview images to a camera display. Typically, the sub-sampled image is provided in bitmap format (RGB or YCC). In the meantime, the normal image acquisition chain performs post-processing on the raw image [110] which typically includes some luminance and color balancing. In certain digital imaging systems the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing involved in the face detection is proportionately reduced. If the sub-sampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector [280] any newly detected candidate face regions [141] are passed onto a face tracking module [111] where any face regions confirmed from previous analysis [145] may be merged with new candidate face regions prior to being provided [142] to a face tracker [290].

The face tracker [290] provides a set of confirmed candidate regions [143] back to the tracking module [111]. Additional image processing filters are preferably applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in a next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable sized detector [121], as one possible example a VJ detector, which then applies a classifier chain, preferably at least a 32 classifier chain, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] is applied at this particular scale and/or perhaps at one scale higher (i.e. 1.25 time larger) and one scale lower (i.e. 1.25 times lower).

As an example of the latter, if the focus of the image acquisition system has moved to approximately infinity, then the smallest scalings will be applied in the face detector [121]. Normally these scalings might not be employed as they may be applied a greater number of times to the candidate face region in order to cover it completely. The candidate face region will typically have a minimum size beyond which it should not decrease. This is in order to allow for localized movement of the camera by a user between frames. In some image acquisition systems which contain motion sensors, such localized movements may be tracked. This information may be employed to further improve the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected, and these can be explicitly returned by the tracker [290] or can be calculated by the tracking module [111] by analyzing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled, and so provided to the detector [280], and also to provide the resolution [146] at which the next acquired image is to be sub-sampled.

Where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are preferably merged with the previous set of confirmed regions [145] to provide the set of candidate regions [142] to the extractor [125] for the next acquired image.

Zoom information may be obtained from camera firmware. Using software techniques which analyze images in camera memory 140 or image store 150, the degree of pan or tilt of the camera may be determined from one image to another.

In one embodiment, the acquisition device is provided with a motion sensor 180, as illustrated at FIG. 1, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e. constant video acquisition as distinct from acquiring a main image, shake compensation would typically not be used because image quality is lower. This provides the opportunity to configure the motion sensor 180 to sense large movements by setting the motion sensor amplifier module to low gain. The size and direction of movement detected by the sensor 180 is preferably provided to the face tracker 111. The approximate size of faces being tracked is already known, and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180.

An alternative way of limiting the areas of an image to which the face detector 120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 190 is preferably applied to a sub-sampled version of the acquired image. If the resolution of the sub-sampled version is not sufficient, then a previous image stored in image store 150 or a next sub-sampled image can be used as long as the two images are not too different in content from the current acquired image. Alternatively, skin segmentation 190 can be applied to the full size video image 130.

In any case, regions containing skin tones are identified by bounding rectangles, which may alternatively be bounding windows of arbitrary shape such as trapezoids, rhombuses, parallelograms, squares, triangles (which may be alternately oriented), or U-shaped or L-shaped windows, or windows with one or more curved sides, or circular or elliptical windows, or other polygons or curved shapes. The exemplary bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a VJ (Viola-Jones) detector 120, a shorter classifier chain can be employed to more effectively provide similar quality results to running face detection over the whole image with longer VJ classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 145.

Contrast enhancement may be used to increase local contrast of an image, especially when the usable data of the image is represented by close contrast values. Through this adjustment, intensities of pixels of a region when represented on a histogram which would otherwise be closely distributed can be better distributed. This allows for areas of lower local contrast to gain a higher contrast without affecting global contrast. Histogram equalization accomplishes this by effectively spreading out the most frequent intensity values.

The method can be useful when working with images including backgrounds and foregrounds that are both bright or both dark. In particular, the method can lead to better detail in photographs that are over-exposed or under-exposed. Alternatively, this luminance correction can be included in the computation of an "adjusted" integral image in the generators 115.

In another embodiment, when face detection is being used, the camera application may be set to dynamically modify the exposure from the computed default to a higher values (from frame to frame, slightly overexposing the scene) until the face detection provides a lock onto a face.

This aspect can take advantage of the facility in some modern digital still or video cameras of high power or infrared LEDs or indeed visible light sources. These are typically used to determine an approximate range to subject or to improve the illumination of subject, particularly in low-lighting conditions. Some cameras may employ a second sensor, or may change the optical filters for the main CCD sensor in order to increase sensitivity to low-light conditions. This mode is often known as a night-view mode. Typically, these enhancement subsystems are activated manually by the user and in the case of still cameras they are typically employed immediately before a main image acquisition.

As described in co-pending application Ser. No. 11/767,412, filed Jun. 22, 2007, which is incorporated by reference, in face detection processes such as disclosed in Viola-Jones, during analysis of a detection window and/or while oscillating around the detection window, a confidence level can be accumulated providing a probabilistic measure of a face being present at the location of the detection window. When the confidence level reaches a preset threshold for a detection window, a face is confirmed for location of the detection window. Where a face detection process generates such a confidence level for a given location of detection window, the confidence level can be captured and stored as an indicator of the probability of a face existing at the given location, even if a face is not detected.

Alternatively, where a face detection process applies a sequence of tests each of which produce a Boolean "Face" or "No face" result, the extent to which the face detection process has progressed through the sequence before deciding no face exists at the location can be taken as equivalent to a confidence level and indicating the probability of a face existing at the given location. So for example, where a cascade of classifiers failed to detect a face at a window location at classifier 20 of 32, it could be taken that this location is more likely to include a face (possibly at a different scale or shifted slightly) than where a cascade of classifiers failed to detect a face at a window location at classifier 10 of 32.

Thus, when using real-time face tracking within a camera, on each frame of the preview stream a current probability for each face region can be available, together with a cumulative probability which is determined from a history of each face region across the previous N preview images. In normal situations the cumulative probability is relatively high, say 70%+, and the current probability would be of the same order with an error factor of, say −10%.

When a face disappears from a scene being scanned by a face tracker, the current probability can drop suddenly towards zero. Sometimes a face can disappear because it has increased its scale very quickly or has moved too suddenly to be associated with its historic location in the scene and in such cases the face must be re-acquired.

In other cases, however, the probability will not drop to zero, but rather there will be a sudden drop in the current probability when compared with the historic probability. Typically such drops occur due to external changes in the acquisition conditions. For example, a face may move from a region of frontal lighting into a region where is it subject to back-lighting, or side-lighting. Alternatively, a face may move away from the camera to an extreme of range within which a face cannot be reliably detected; or the overall lighting in a scene may suddenly be reduced (artificial lighting is turned off, or the scene moves from outdoors to indoors, etc).

In a typical camera there may be a response to the latter case where global lighting is reduced, but in the other cases a camera will be unable to compensate for the local behavior of a single face.

According to this aspect, when the current face probability of a tracked region experiences a drop in probability at a rate above a given threshold, one or more of the above mentioned enhancement subsystems or indeed other sub-systems are activated over the next few preview frames to determine if the change in acquisition conditions can be addressed. For example, if a face was already of a small size then the camera may auto-zoom to increase the size of the face image, thus increasing the face region probability over the next few preview acquisitions. In cases where local illumination was low or contrast was poor (this can be determined from a histogram, or may be available from hardware) and the camera is equipped with external illumination devices, or a night-view mode, then these subsystems may be activated to determine if the face region probability improves. Other embodiments may use the conventional camera flash to initiate a timed sequence of micro-flashes to correspond with the acquisition of preview frames. These measures would typically be temporary (as they could deplete batteries if used over a prolonged period) and it may be desirable to provide user feedback through audio beeps, or otherwise to signify that face enhancements have been activated.

Although this aspect enables a face-tracker to continue to operate accurately in low or locally adverse lighting conditions, or at the extremes of range, the activation of additional camera subsystems can also provide historically accumulated information which can be advantageously employed for main image acquisition. Such information is additional to and distinct from information which may be determined from face regions at the time of main image acquisition. Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 170, as illustrated at FIG. 1. This can include a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or anti-clockwise.

Once this determination is made, the camera orientation can be fed to one or both of the face detectors 120, 121. The detectors may apply face detection according to the likely orientation of faces in an image acquired with the determined camera orientation. This feature can either significantly reduce the face detection processing overhead, for example, by avoiding the employment of classifiers which are unlikely to detect faces or increase its accuracy by running classifiers more likely to detects faces in a given orientation more often.

Figure 2:
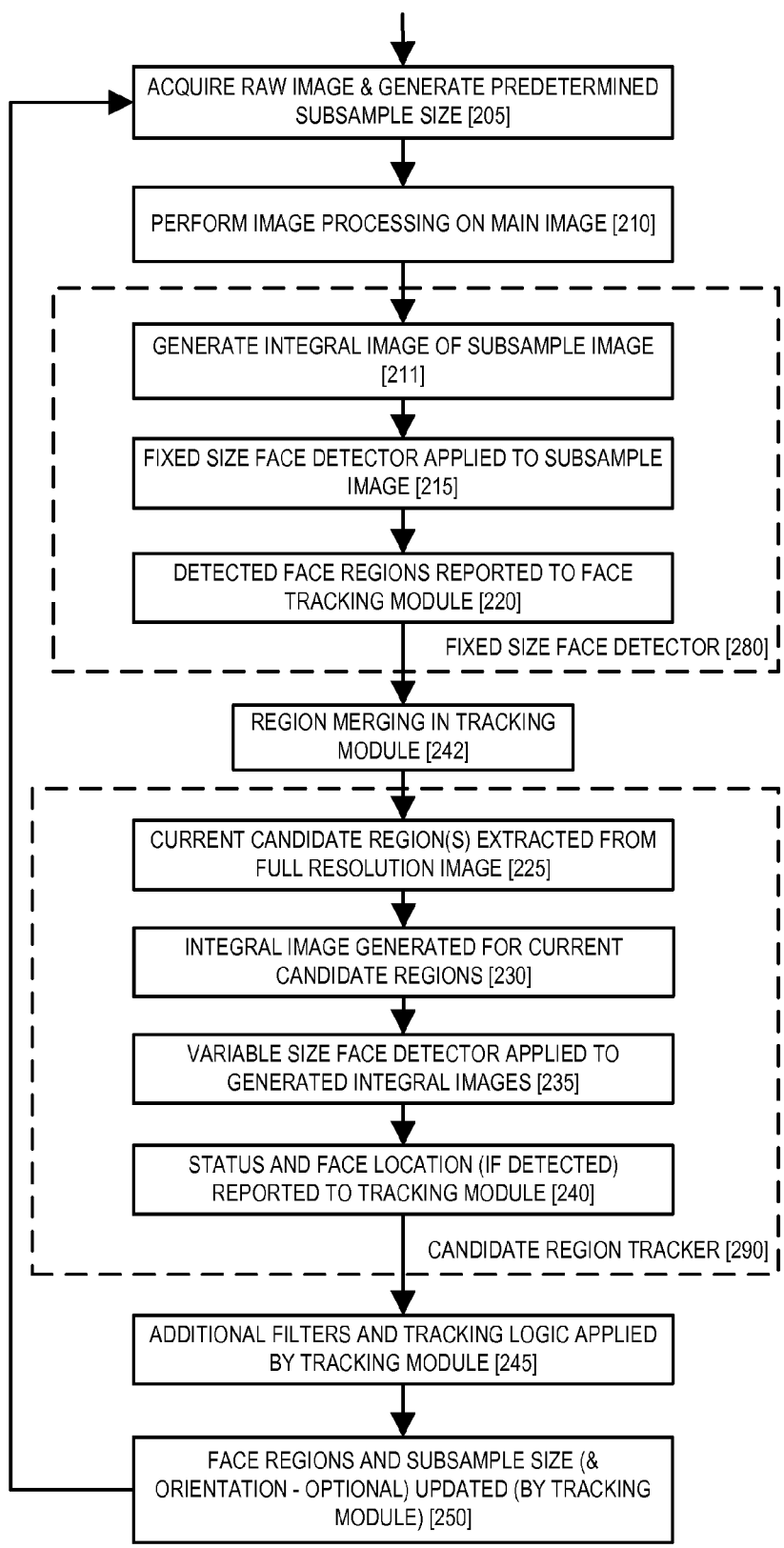
FIG. 2 is a flow diagram illustrating operation of the image processing apparatus of FIG. 1.

FIG. 2 illustrates a main workflow in accordance with a preferred embodiment. The illustrated process is split into (i) a detection/initialization phase which finds new candidate face regions [141] using a fast face detector [280] which operates on a sub-sampled version of the full image; (ii) a secondary face detection process [290] which operates on extracted image patches for candidate regions [142], which are determined based on locations of faces in one or more previously acquired image frames, and (iii) a main tracking process which computes and stores a statistical history of confirmed face regions [143]. Although the application of the fast face detector [280] is shown occurring prior to the application of the candidate region tracker [290] in FIG. 2, the order is not critical and the fast detection is not necessarily executed on every frame or in certain circumstances may be spread across multiple frames.

Thus, in step 205 the main image is acquired and in step 210 primary image processing of that main image is performed as described in relation to FIG. 1. The sub-sampled image is generated by the sub-sampler [112] and an integral image is generated therefrom by the generator [115] at step 211. The integral image is passed to the fixed size face detector [120] and the fixed size window provides a set of candidate face regions [141] within the integral image to the face tracking module step 220. The size of these regions is determined by the sub-sampling scale [146] specified by the face tracking module to the sub-sampler and this scale is preferably based on an analysis of previous sub-sampled/integral images by the detector [280] and patches from previous acquired images by the tracker [290] as well perhaps as other inputs such as camera focus and movement.

The set of candidate regions [141] is merged with the existing set of confirmed regions [145] to produce a merged set of candidate regions [142] to be provided for confirmation at step 242.

For the candidate regions [142] specified by the face tracking module 111, the candidate region extractor [125] extracts the corresponding full resolution patches from an acquired image at step 225. An integral image is generated for each extracted patch at step 230 and a variable-size face detection is applied by the face detector 121 to each such integral image patch, for example, a full Viola-Jones analysis. These results [143] are in turn fed back to the face-tracking module [111] at step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280] at step 245.

For example, if a face region had been tracked over a sequence of acquired images and then lost, a skin prototype could be applied to the region by the module [111] to check if a subject facing the camera had just turned away. If so, this candidate region may be maintained for checking in a next acquired image whether the subject turns back to face the camera.

Depending on the sizes of the confirmed regions being maintained at any given time and the history of their sizes, e.g. are they getting bigger or smaller, the module 111 determines the scale [146] for sub-sampling the next acquired image to be analyzed by the detector [280] and provides this to the sub-sampler [112] step 250.

The fast face detector [280] need not run on every acquired image. So, for example, where only a single source of sub-sampled images is available, if a camera acquires 60 frames per second, 15-25 sub-sampled frames per second (fps) may be required to be provided to the camera display for user previewing. Clearly, these images need to be sub-sampled at the same scale and at a high enough resolution for the display. Some or all of the remaining 35-45 fps can be sampled at the scale required by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment, the sample rate may decrease.

Alternatively, the decision on the next sample may also be performed based on processing of the content of selected images. If there is no significant change in the image stream, the full face tracking process might not be performed. In such cases, although the sampling rate may be constant, the images will undergo a simple image comparison and only if it is decided that there is justifiable differences, will the face tracking algorithms be launched.

The face detector [280] also need not run at regular intervals. So for example, if the camera focus is changed significantly, then the face detector may be run more frequently and particularly with differing scales of sub-sampled images to try to detect faces which should be changing in size. Alternatively, where focus is changing rapidly, the detector [280] could be skipped for intervening frames, until focus has stabilized. However, it is generally when focus goes to approximately infinity that the highest resolution integral image is to be produced by the generator [115].

In this latter case, the detector may not be able to cover the entire area of the acquired, subsampled, image in a single frame. Accordingly the detector may be applied across only a portion of the acquired, subsampled, image on a first frame, and across the remaining portion(s) of the image on one or more subsequent acquired image frames. In a one embodiment, the detector is applied to the outer regions of the acquired image on a first acquired image frame in order to catch small faces entering the image from its periphery, and on subsequent frames to more central regions of the image.

In a separate embodiment, the face detector 120 will be applied only to the regions that are substantively different between images. Note that prior to comparing two sampled images for change in content, a stage of registration between the images may be needed to remove the variability of changes in camera, caused by camera movement such as zoom, pan and tilt.

In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking may include a stream of preview images, and the final image in the series may be the full resolution acquired image. In such a case, the face tracking information can be verified for the final image in a similar fashion to that described in FIG. 2. In addition, information such as coordinates or mask of the face may be stored with the final image. Such data may fit as an entry in a saved image header, for example, for future post-processing, whether in the acquisition device or at a later stage by an external device.

FIG. 3 illustrates operation in accordance with a preferred embodiment through a worked example. FIG. 3(*a*) illustrates a result at the end of a detecting and tracking cycle on a frame of video, with two confirmed face regions [301, 302] of different scales being shown. In this exemplary embodiment, for pragmatic reasons, each face region has a rectangular bounding box. Although it is easier to make computations on rectangular regions, different shapes can be used. This information is recorded and output as [145] by the tracking module [111] of FIG. 1.

Based on a history of the face regions [301, 302], the tracking module [111] may decide to run fast face tracking with a classifier window of the size of face region [301] with an integral image being provided and analyzed accordingly.

FIG. 3(*b*) shows the situation after the next frame in a video sequence is captured and the fast face detector has been applied to the new image. Both faces have moved [311, 312] and are shown relative to previous face regions [301, 302]. A third face region [303] has appeared and has been detected by the fast face detector [303]. In addition, a fast face detector has found the smaller of the two previously confirmed faces [304], because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303], [304] and [302] to the candidate region extractor [290]. The tracking module [111] knows that the region [302] has not been picked up by the detector [280]. This may be because the face has either disappeared, remains at a size that was too large or small to be detected by the detector [280] or has changed size to a size that the detector [280] was unable to detect. Thus, for this region, the module [111] will preferably specify a large patch [305]. Referring to FIG. 3(*c*), this patch [305] is around the region [302] to be checked by the tracker [290]. Only the region [303] bounding the newly detected face candidate will preferably be checked by the tracker [290], whereas because the face [301] is moving, a relatively large patch [306] surrounding this region is specified to the tracker [290].

FIG. 3(*c*) shows the situation after the candidate region extractor operates upon the image. Candidate regions [306, 305] around both of the confirmed face regions [301, 302] from the previous video frame as well as new regions [303] are extracted from the full resolution image [130]. The size of these candidate regions has been calculated by the face tracking module [111] based partly on statistical information relating to the history of the current face candidate and partly on external metadata determined from other subsystems within the image acquisition system. These extracted candidate regions are now passed on to the variable sized face detector [121] which applies a VJ face detector to the candidate region over a range of scales. The locations of any confirmed face regions are then passed back to the face tracking module [111].

FIG. 3(*d*) shows the situation after the face tracking module [111] has merged the results from both the fast face detector [280] and the face tracker [290] and applied various confirmation filters to the confirmed face regions. Three confirmed face regions have been detected [307, 308, 309] within the patches [305, 306, 303] shown in FIG. 3(*d*). The largest region [307] was known, but had moved from the previous video frame, and relevant data is added to the history of that face region. Another previously known region [308] which had moved was also detected by the fast face detector which serves as a double-confirmation, and these data are added to its history. Finally a new face region [303] was detected and confirmed and a new face region history is then initiated for this newly detected face. These three face regions are used to provide a set of confirmed face regions [145] for the next cycle.

There are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focusing, by ensuring that focus is set on a detected face or indeed to adjust other capture settings for the optimal representation of the face in an image.

The corrections may be done as part of pre-processing adjustments. The location of the face tracking may also be used for post processing, and in particular selective post processing, where regions with faces may be enhanced. Such examples include sharpening, enhancing, saturating, brightening or increasing local contrast, or combinations thereof. Preprocessing using the locations of faces may also be used on regions without a face to reduce their visual importance, for example, through selective blurring, desaturating, or darkening.

Where several face regions are being tracked, then the longest lived or largest face can be used for focusing and can be highlighted as such. Also, the regions [145] can be used to limit areas on which, for example, red-eye processing is performed (see, e.g., U.S. published patent applications numbers 2008/0317339, 2004/0223063, 2005/0031224, 2005/0140801, and 2004/0041121, and U.S. Pat. Nos. 6,407,777, 7,352,394, 7,474,341, and 7,042,505, and U.S. Ser. No. 11/936,085, filed Nov. 7, 2007, and Ser. No. 12/042,335, filed Mar. 5, 2008, and 61/094,034, and 61/094,036, which are hereby incorporated by reference).

Other post-processing which can be used in conjunction with light-weight face detection is face recognition. In particular, such an approach can be useful when combined with more robust face detection and recognition either running on the same device or an off-line device that has sufficient resources to run more resource-consuming algorithms In this case, the face tracking module [111] reports the locations of confirmed face regions [145] to the in-camera firmware, preferably together with a confidence factor.

When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. The identifier of the person, and the last known location of the face, is stored either in the image (in a header) or in a separate file stored on the camera storage [150]. This storing of the person's ID can occur even when a recognition module [160] fails for the immediately previous number of frames, but for which a face region was still detected and tracked by the module [111].

When the image is copied from camera storage to a display or permanent storage device such as a PC (not shown), persons' ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161].

When multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This allows reliable identification of persons in the image.

This feature of a system in accordance with a preferred embodiment solves a problem with algorithms that use a single image for face detection and recognition and may have lower probability of performing correctly. In one example, for recognition, if a face is not aligned within certain strict limits it becomes very difficult to accurately recognize a person. This method uses a series of preview frames for this purpose as it can be expected that reliable face recognition can be done when many more variations of slightly different samples are available.

Face Detection Over Multiple Preview Frames

In a further embodiment, as preview frames arrive at a rate of 30-50 fps, it is desirable to achieve an improved speed of determining potential face candidate regions within a digital camera in order to improve the performance of various in-camera algorithms. This is particularly true for portable digital still and video cameras, camera phones, and other camera-enabled embedded devices and other portable processor-based devices with image processing capability.

Within a typical face-tracker there are typically three steps applied to each image frame: (i) detection of new faces; (ii) merging of new faces with existing "tracked" regions and (iii) confirmation of each "merged" region. When processing is completed at the end of each preview frame the output is a set of confirmed, tracked, face regions. These are carried through to step (ii) of the next frame, but the bounding frame of the face region is enlarged to account for movement of the tracked face between frames. The size (and direction) of enlargement may be controlled by the frame rate, detected camera movement or the zoom function of the camera.

The present embodiment employs these "predicted" candidate regions to perform auto-focus, auto-exposure, auto-white balance and auto-color balance functions because they are immediately available at the beginning of each new preview frame and indicate regions of the main image which have a high probability of containing a face candidate region—significantly higher that of the fast, skin-color based, detection algorithm of Ray et al. In addition as an integral image can be rapidly calculated (it is implemented in hardware) this may be advantageously employed to implement fast AE, AWB and CB algorithms.

A digital camera employs a face tracker which analyzes a preview image stream and extracts candidate face regions from successive frames of the preview image stream. These candidate regions are made available within the camera for additional image processing. The face tracker maintains a history of each candidate face region including location data and a cumulative confidence level that the candidate region is indeed a face.

According to this embodiment, an improvement is provided in the speed at which face candidate regions are determined within a new main image once the acquisition of a said main image is actuated by the user of a camera. According to Ray et al., a framing image is first acquired and face detection is applied to this framing image. If this framing image is as large as the main image then this could lead to significant lags, thus it is assumed that the framing image is smaller than the main acquired image. Nevertheless it will still take some time to apply a face detector to the full image. Typically, if a face detector is incorporated into a face tracker implementation, it is not convenient to try to cover all scales with the face detector within a single preview frame.

Therefore in certain embodiments of a face tracker, full face detection is spread over two or more frames, for example, five frames, using an algorithm based on the total number of rectangles, or windows of one or more different shapes, from all the scales that should enter in the detection. For smaller scales, a big number of rectangles are used, and for bigger scales, a smaller number of rectangles are used.

An automatic algorithm is provided that counts a total number of rectangles that enter in detection for a full frame detection on one orientation, and spreads them over X frames. On the first frame, an integral image is calculated, and fewer rectangles are processed, while it is preferred to have the same processing time on all the frames. An example of a distribution over five frames for a big classifier chain (22.times.22) and for image resolution (160.times.120) is illustrated at FIG. 4.

FIG. 4 shows that an integral image according to this example will have 160.times.120 resolution which will be stored for five frames. The scales used for the bounding rectangles in frame 1 may include 67.times.67, 59.times.59, 53.times.53, 48.times.48, 44.times.44 and 39.times.39. In frame two, the bounding rectangles may have scales of 35.times.35 and 28.times.28 in this example. In each of frames 3, 4 and 5, scales of 22.times.22 and 17.times.17 are used (⅓ from the frame).

In an example embodiment, the split may be for a frame rate of 15 fps. Where a higher frame rate would be involved in other embodiments such as 30 fps, the detection may be split over 10 or more frames from the preview stream. In general, the split may be set according to the frame rate. For example, for lower frame rates such as 5 fps, the split may be over two or three frames, or for 10 fps three or four frames. Even with a fast detection algorithm, the techniques employed by Ray et al would require of the order of 0.3 second to achieve a face detection after the user decides to acquire an image. In addition, it is only after this face detection that the AE, AF, AWB or ACC algorithms can be applied. Clearly, it is desirable to be able to speed up the determination of image regions where a face candidate region is likely to occur. Advantageously, in accordance with certain embodiments herein, where a face tracker is operable within a digital camera, it may be constantly searching and updating the locations of faces which were detected in a previous frame of the preview image stream. These faces, or "tracked faces", may have already been confirmed as face regions and their size and approximate location can be predicted from frame to frame with a great degree of reliability.

Further, it is possible in certain embodiments to maintain a "history" of such a tracked face which builds a statistical confidence that a face of a certain size is present at a certain location. A further advantage is that the local luminance and skin color can be determined, also using statistical techniques, to build a dynamic record of the characteristics of this face candidate region. In particular, if face detection fails for a number of frames, it is still possible to retain a high confidence that the face is present by monitoring the local color and luminance characteristics of the tracked region. Thus, for example, when a person turns to present a face profile they can still be tracked using the statistical color, luminance and size data from the tracked history.

Figure 5:
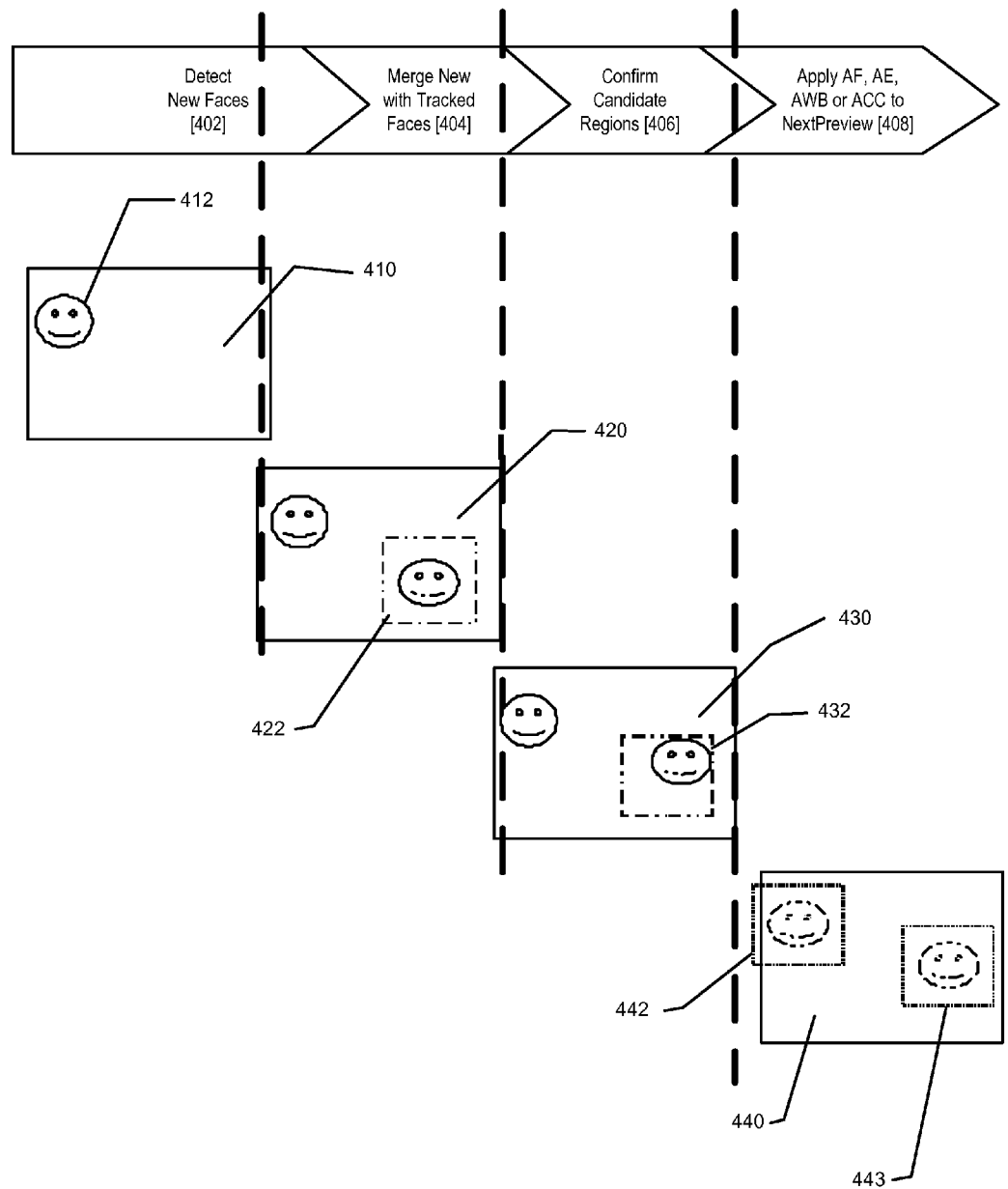
FIG. 5 illustrates basic operations of a face tracker on a preview image frame in accordance with certain embodiments.

The basic operations of a face tracker on a single preview image frame are now described with reference to FIG. 5. In certain embodiments, there may be three principle processing steps applied to each preview image frame: (i) a detection algorithm 402 is run over at least a portion of the image frame at a subset of the full range of detector scales; (ii) any new candidates determined from step (i) are next merged 404 with the tracked candidates determined during the previous image frame, and then (iii) a variable size face detector and/or one or more confirming filters are run 406 to more accurately determine the size, location, local contrast, luminance and/or color gamut of the merged face regions. At the end of this process, a set of current face candidates are output and a history record is updated for existing face regions, and/or a new history is created for newly detected faces.

Thus, in a highly advantageous aspect of certain embodiments, at the end of any particular preview image frame, the device has a set of confirmed face candidate regions which apply to that preview image frame. These candidate regions include regions which may have been tracked over multiple frames 432, and also regions which may have been only detected and confirmed during the current frame 434. Both types of regions will become tracked regions in the next preview frame and their location(s) and/or size(s) in the current frame will be used to determine their likely location(s) and/or size(s) in the next frame.

In a further example, where a person in a scene may be walking towards the camera, the person's face will grow from frame to frame. Thus, on each subsequent frame during the confirming step 406, the tracking algorithm after inspecting the history record for this face region may first employ the next largest size of face detector, then the current size. If the face is still not confirmed then additional filters such as a skin pixel filter will try to determine if the face has turned to an angle, or has perhaps grown more than one size, or moved more than was expected and is thus outside the original bounding box which can then be enlarged. However, in certain embodiments, the accurate determination of a tracked face region in one preview image frame is utilized to predict the location of the same face region in the following image frame typically within a 20% larger bounding box. The exact increase in size of the bounding box depends in part on the size of the face region, the frame rate of the preview stream, and/or the amount of camera motion caused by the user, and so on. Thus, the 20% figure is only illustrative and may be adjusted up or down.

Several advantages of methods and devices are provided in accordance with various embodiments. First, the locations of tracked face region are known to a high degree of accuracy at the beginning of each preview image frame. Thus it is not necessary to initiate a face detection process prior to an image acquisition. In fact AE (auto-exposure), AF (auto-focus), AWB (auto white balance) and ACC (auto color correction) algorithms can occur at the beginning of each preview image frame prior to the face detection phase for that frame.

Second, in certain embodiments, statistical data gathered by the face tracker about each face region can also be utilized in these algorithms leading to faster execution and a more rapid response to varying luminance and focus conditions.

Third, the main image acquisition process may occur at any point during the preview image processing cycle. There is no need to wait for the completion of the face detector process as the predicted location(s) of previously tracked face regions within the current preview image is already known and these will correspond closely with the location(s) of faces in the main acquired image. Thus, image acquisition can begin immediately upon user actuation.

Fourth, the use of an integral image face detector implies that an Integral Image (II) will be calculated for each preview image. This enables very fast computation of the luminance within various portions of the image. Further, it is not difficult to also incorporate an Integral-squared Image (121) calculating subsystem which enables a measure of luminance variance across a portion of the image. Such a subsystem is described in US 20060126938 to Lee et al. Data from both II and 121 can be advantageously utilized in various embodiments of AE, AF, AWB and ACC algorithms.

Where a tracked face region fails to be detected, but where sufficient confirmation filters, such as skin or luminance variance, suggest that a face is still present, then the exposure settings can be increased on successive preview frames until a face detection lock is re-acquired.

A state-of-art autofocus algorithm is described in "Modified Fast Climbing Search Auto-focus Algorithm with Adaptive Step Size Searching Technique for Digital Camera" to He et al and published in IEEE Trans. Consum. Electron. Vol 49 No. 2, pp 257-262, 2003, hereby incorporated by reference. This algorithm may be applied to regions in the center of an image, AREA1 and AREA2 where AREA 2 is contained within AREA1. The same focus algorithm, or a variant thereof, can be applied to the tracked face regions. Where several face regions are being tracked, then the longest lived or largest face can be used for focusing and can be highlighted as such. Another state of art focus algorithm is described in "Efficient Auto-Focus Algorithm Utilizing Discrete Difference Equation Prediction Model for Digital Still Cameras" to Chen et al. and presented in IEEE Transactions on Consumer Electronics, Vol. 52, No. 4, p 1135-1143, NOVEMBER 2006, hereby incorporated by reference. This algorithm and/or auto white balance and/or auto color correction can be applied to the longest lived or largest tracked face region.

The regions [145] can be used to limit areas on which, for example, red-eye processing is performed (see, e.g., U.S. published patent applications numbers 2004/0223063, 2005/0031224, 2005/0140801, and 2004/0041121, and U.S. Pat. Nos. 6,407,777 and 7,042,505, and/or other references cited above herein, which are all hereby incorporated by reference).

The present invention is not limited to the embodiments described above herein, which may be amended or modified without departing from the scope of the present invention, which is set forth in the appended claims, and also includes structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

Alternative Embodiments

All references cited above herein, in addition to the background and summary of the invention sections themselves, are hereby incorporated by reference into the detailed description of the embodiments as disclosing alternative embodiments and components. The following are also incorporated by reference for this purpose: U.S. patent application Ser. Nos. 12/042,104, 11/761,647, 11/554,539, 11/464,083, 11/027,001, 10/842,244, 11/024,046, 11/233,513, 11/460,218, 11/573,713, 11/319,766, 11/464,083, 11/744,020, 11/767,412, 10/763,801, 11/573,713, 12/042,104, 11/859,164, 12/026,484, 11/861,854, and 11/460,218; and U.S. published patent applications nos. 2008/0013798, 2008/0031498, 2006/0285754, 2006/0140455, 2006/0120599, 2006/0039690, 2008/0285754, 2007/0189748, 2007/0269108, 2008/0175481, and 2005/0068452; and U.S. Pat. Nos. 7,474,341, 7,466,866, 7,515,740, 7,315,631, 7,403,643, and 7,460,695.

Many alternative methods of tracking faces in an image stream with a digital image acquisition device are provided. An acquired image may be received from an image stream including one or more face regions. The acquired image may be sub-sampled at a specified resolution. A corresponding integral image may be calculated for a least a portion of the sub-sampled image. Face detection may be applied to at least a portion of the integral image to provide a set of one or more candidate face regions. A resolution may be adjusted for sub-sampling a next acquired image. The above may be repeated at the adjusted resolution periodically on selected images of an image stream including a main acquired image chronologically following multiple images of the selected images.

Candidate face regions of different sizes from the multiple images of the image stream may be tracked.

The set of candidate face regions may be merged with a previously detected face region to provide a set of candidate face regions of different sizes. For each region of the acquired image corresponding to a region of merged set of candidate face regions, an integral image may be calculated and a variable-sized face detection may be applied to each merged region integral image to provide a set of confirmed face regions and a set of rejected face regions. A rejected face region may be checked based on alternative criteria from the variable sized face detection. Responsive to the checking, a rejected face region may be indicated as a face region, and the previously rejected face region may be added to the set of confirmed face regions. The checking may include applying a skin prototype to the rejected face region. The merging may include merging a set of candidate face regions for an acquired image with the set of confirmed face regions for a previously acquired image. The regions of the acquired image corresponding to a region of the merged set of candidate face regions may include regions surrounding respective regions of the merged set of candidate face regions. Variable sized face detection may be applied including applying multiple cascades of Haar classifiers of varying size to each merged region integral image. Twelve or fewer sizes of cascades of Haar classifiers, such as 3 or 4, may be applied. Each cascade may include 32 classifiers.

The adjusting may include cycling through a set of at least approximately four sub-sampling resolutions. The adjusting may be responsive to the image being acquired at approximately infinite focus for adjusting the sub-sampling resolution to maximum resolution.

Size or location, or both, of a candidate face region may be stored in association with the main acquired image. Spatially selective post processing of the main acquired image may be performed based on the stored candidate face region's size or location or both. The selective image processing includes any of color correction, sharpening, blurring, saturation, subsampling, and/or compression.

The face detection may include a fixed size, and wherein said one or more candidate face regions each have a given size and respective location.

The time interval between selected images may be fixed or variable and determined during execution. The time interval may be a function of the time taken to process one or more previous main acquired images. The time interval may be dependent on changes in image content for one or more selected images. The cascade may include approximately 32 classifiers or more.

The method may be performed responsive to changes in content from image to image in the image stream.

The application of face detection comprises applying a cascade of Haar classifiers of a fixed size to said integral image.

An acquired image may be displayed. The tracked candidate face regions may be superimposed on the displayed acquired image.

Responsive to the acquired image being captured with a flash, regions of the acquired image corresponding to the tracked candidate face regions may be analyzed for red-eye defects, which may be in turn corrected. The acquired image may be stored with an indication of any red-eye defects.

Further alternative methods are provided for detecting faces in an image stream using a digital image acquisition device. An orientation of a digital image acquisition device may be determined for at least one image of an image stream. The image, which includes one or more face regions, may be acquired from the image stream. Face detection may be applied to at least a portion of the acquired image to provide a set of one or more candidate face regions according to the determined orientation. The face detection may selectively employ a sequence of classifiers from multiple available classifier sequences each at a given orientation.

Each candidate face region may have a given size and/or respective location.

Face recognition may be selectively applied with the database to at least one candidate face region. An identifier may be provided for each face recognized in a candidate face region. The identifier may be stored for each recognized face in association with at least one image of the image stream.

A further method may include detecting faces in an image stream using a digital image acquisition device. A first acquired image may be received from the image stream including one or more face regions. Face detection may be applied to at least a portion of the first acquired image to provide a set of one or more candidate face regions each having a probability of being a face region. Candidate face regions may be tracked across multiple images of the image stream including the first acquired image. Responsive to a probability of a tracked face regions dropping by more than a threshold rate with respect to time, an enhancement subsystem may be activated for a period of time to improve the probability of the face detection detecting a candidate face region.

The activating may include acquiring each new image of the image stream with a progressively increased exposure parameter until at least one candidate face region is detected with a probability above a given threshold.

The activating may include activating one or more of an LED, an infra-red LED, a visible light source, or a micro-flash. Subsequently, one or more images of the image stream may be acquired until at least one candidate face region is detected with a probability above a given threshold.

The activating may include changing an optical filter. Subsequently, one or more images of the image stream may be acquired until at least one candidate face region is detected with a probability above a given threshold.

The activating may include activating a second image acquisition sensor. Subsequently, one or more images of the image stream may be acquired until at least one candidate face region is detected with a probability above a given threshold.

The application of face detection may include sub-sampling the acquired image at a specified resolution to provide a sub-sampled image. One or more regions of the acquired image may be identified predominantly including skin tone. A corresponding integral image may be calculated for a least one of the skin tone regions of the sub-sampled acquired image. Face detection may be applied to a portion or more of the integral image. The identifying may be performed on the sub-sampled image.

Prior to applying face detection for a candidate face region associated with a previous image, the contrast of the luminance characteristics of the corresponding region of the acquired image may be enhanced.

A history may be stored of a tracked region's probability with an acquired image.

An image processing apparatus including one or more processors and one or more digital storage media is also provided having digitally-encoded instructions embedded therein for programming the one or more processors to perform any of the methods of detecting faces in an image stream using a digital image acquisition device described herein.

Methods are provided for detecting, tracking or recognizing faces, or combinations thereof, within acquired digital images of an image stream. An image processing apparatus is also provided including one or more processors and one or more digital storage media having digitally-encoded instructions embedded therein for programming the one or more processors to perform any of these methods.

Methods are provided for tracking faces in an image stream with a digital image acquisition device. An acquired image may be received from an image stream including one or more face regions. The acquired image may be sub-sampled at a specified resolution to provide a sub-sampled image. A corresponding integral image may be calculated for a least a portion of the sub-sampled image. A fixed size face detection may be applied to at least a portion of the integral image to provide a set of one or more candidate face regions each having a given size and a respective location. Responsive to the given size and respective location of the candidate face regions, and optionally including one or more previously detected face regions, adjusting a resolution at which a next acquired image may be sub-sampled.

In another embodiment, calculations may be avoided of a complete highest resolution integral image for every acquired image in an image stream, thereby reducing integral image calculations in an advantageous face tracking system. This either reduces processing overhead for face detection and tracking or allows longer classifier chains to be employed during the frame-to-frame processing interval to provide higher quality results, and either way providing enhanced face tracking. This can significantly improve the performance and/or accuracy of real-time face detection and tracking.

In certain embodiments, when implemented in an image acquisition device during face detection, a subsampled copy of the acquired image may be extracted from the camera hardware image acquisition subsystem and the integral image may be calculated for this subsampled image. During face tracking, the integral image may be calculated for an image patch surrounding each candidate region, rather than the entire image.

In such an implementation, the process of face detection may be preferably spread across multiple frames. This approach is advantageous for effective implementation. In one example, digital image acquisition hardware is designed to subsample to a single size. This aspect takes advantage of the fact that when composing a picture, a face will typically be present for multiple frames within video sequences. Significant improvements in efficiency are provided, while the reduction in computation does not impact very significantly on the initial detection of faces.

In certain embodiments, the 3-4 smallest sizes (lowest resolution) of subsampled images are used in cycle. In some cases, such as when the focus of the camera is set to infinity, larger image subsamples may be included in the cycle as smaller (distant) faces may occur within the acquired image(s). In yet another embodiment, the number of subsampled images may change based on the estimated potential face sizes based on the estimated distance to the subject. Such distance may be estimated based on the focal length and focus distance, these acquisition parameters may be available from other subsystems within the imaging appliance firmware.

By varying the resolution/scale of the sub-sampled image which is in turn used to produce the integral image, a single fixed size of classifier can be applied to the different sizes of integral image. Such an approach is particularly amenable to hardware embodiments where the subsampled image memory space can be scanned by a fixed size direct memory access (DMA) window and digital logic to implement a Haar-feature classifier chain can be applied to this DMA window. However, it will be seen that several sizes of classifier (in a software embodiment), or multiple fixed-size classifiers (in a hardware embodiment) could also be used.

An advantage of this aspect is that from frame to frame the calculation involves a low resolution integral image.

Preferably, a full resolution image patch surrounding each candidate face region is acquired prior to the acquisition of the next image frame. An integral image may be then calculated for each such image patch and a multi-scaled face detector is applied to each such image patch. Regions which are found by the multi-scaled face detector to be face regions are referred to as confirmed face regions.

This aspect advantageously avoids involvement of motion and audio queues as described in Rui (citation above) and allows significantly more robust face detection and tracking to be achieved in a digital camera.

In accordance with another embodiment, a face detection and recognition method is also provided. An acquired image may be received from an image stream including one or more face regions. The acquired image may then be sub-sampled at a specified resolution to provide a first-sub-sampled image. An integral image may be calculated for a least a portion of the sub-sampled image. Face detection may be applied to at least a portion of the integral image to provide a set of one or more candidate face regions each including a given size and a respective location. Using a database, face recognition may be selectively applied to one or more candidate face regions to provide an identifier for a recognized face. The identifier may be stored for the recognized face in association with at least one image from the image stream.

In another embodiment, when face tracking detects a face region from a stream of images, the acquisition device firmware runs a face recognition algorithm at the location of the face using a database preferably stored on the acquisition device comprising personal identifiers and their associated face parameters.

This aspect mitigates problems of algorithms that use a single image for face detection and recognition which have lower probability of performing correctly.

In another embodiment, an orientation of a digital image acquisition device is determined for at least one acquired image of an image stream. Face detection is applied to at least a portion of the acquired image to provide a set of one or more candidate face regions according to the determined orientation, and each candidate face region has a given size and a respective location.

In another embodiment, the acquisition device includes an orientation sensor which indicates the likely orientation of faces in acquired images. The determined camera orientation is fed to face detection processes which then apply face detection for the likely orientation of faces. This improves processing requirements and/or face detection accuracy.

In a further embodiment, a method is provided for tracking faces in an image stream using a digital image acquisition device. An acquired image is received from an image stream including one or more face regions. An indication of relative movement of the acquired image relative to a previously acquired image is also received. The previously acquired image includes an associated set of candidate face regions having a given size and a respective location. Adjusted face detection is applied to at least a portion of the acquired image in the vicinity of the candidate face regions as a function of the movement to provide an updated set of candidate face regions.

A face tracking module in accordance with this aspect has improved performance, as it employs a motion sensor subsystem to indicate to the face tracking module large motions of the acquisition device during a face tracking sequence.

Without such an advantageous sensor, where the acquisition device is suddenly moved by a user rather than slowly panned across a scene, candidate face regions in the subsequent frames of a video sequences could be displaced beyond the immediate vicinity of the corresponding candidate region in the previous video frame, such that the face tracking module could fail to track the face and the process would then involve re-detection of the candidate.

In another embodiment, a method and apparatus are provided for detecting faces in an image stream using a digital image acquisition device. An acquired image is received from an image stream including one or more face regions. An acquired image is sub-sampled at a specified resolution to provide a sub-sampled image. One or more regions of said acquired image are identified that predominantly include skin tones. A corresponding integral image is calculated for a least one of the skin tone regions of the sub-sampled acquired image. Face detection is applied to at least a portion of the integral image to provide a set of one or more candidate face regions each having a given size and a respective location.

By only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection involved in positively detecting a face.

Another method is provided including recognizing faces in an image stream. A database includes an identifier and associated parameters for each of a number of one or more faces to be recognized. A new acquired image from an image stream is received. Face detection is applied to at least a portion of the acquired image to provide a set of one or more candidate face regions each having a given size and a respective location. Using the database, face recognition is selectively applied to at least one candidate face region to provide an identifier for a face recognized in the candidate face region. A portion of the image including the recognized face is stored in association with at least one image of the image stream.

The selective application of face recognition may include selecting only one or more candidate face regions having a frontal alignment for face recognition. The method may further include selecting only one or more candidate face regions including two eye regions and a mouth region within a given area of the candidate face region.

The method may also include providing a level of confidence for each candidate face region based on the face detection. A candidate face region may be designated with a first level of confidence as a face region. Face recognition may only be applied to candidate face regions having a second confidence level higher than the first level of confidence.

The method may also include applying an Active Appearance Model (AAM) to each candidate face region, and applying face recognition only to one or more candidate face regions having AAM parameters indicating the candidate face region has a vertical and a horizontal rotation within a pre-determined range.

The face detection may include applying chain classifiers to the main image, wherein at least one of the classifiers includes a frontal classifier chain. Face recognition may be applied only to one or more candidate face regions detected with the frontal classifier chain.

The method may also include calculating an average luminance for each candidate face region. Face recognition may be applied only to one or more candidate face regions having average luminance within a pre-determined range.

The new acquired image may be a low resolution preview image. The portion of the image including a recognized face may be stored in association with a main high resolution image.

A further method is provided for tracking faces in an image stream. An acquired image is received from an image stream including one or more face regions. The acquired image is sub-sampled at a specified resolution. A corresponding integral image is calculated for a least a portion of the sub-sampled image. Face detection is applied to at least a portion of said integral image to provide a set of one or more candidate face regions each having a given size and a respective location. The set of candidate face regions is merged with one or more previously detected face regions to provide a set of candidate face regions of different sizes or locations or both.

Candidate face regions of different sizes may be tracked from multiple images of the image stream.

For each region of the acquired image corresponding to a region of the merged set of candidate face regions, an integral image may be calculated and variable-sized face detection may be applied to each merged region integral image to provide a set of confirmed face regions and a set of rejected face regions. Rejected face regions may be checked based on alternative criteria from said fixed and variable sized face detection. Responsive to the checking, One or more rejected face regions may be indicated as face regions, and the previously rejected face regions may be added to the set of confirmed face regions. The checking may include applying a skin prototype to a rejected face region.

The merging may involve merging a set of candidate face regions for an acquired image with the set of confirmed face regions for a previously acquired image.

Regions of said acquired image corresponding to regions of the merged set of candidate face regions may include regions surrounding respective regions of the merged set of candidate face regions.

Variable sized face detection may be applied including applying cascades of Haar classifiers of varying size to each merged region integral image. Twelve or fewer sizes of cascades of Haar classifiers may be applied, e.g., 3 or 4 sizes of Haar classifiers. Each cascade may include 32 classifiers.

Applying fixed size face detection may include applying a cascade of Haar classifiers of a fixed size to the integral image.

Responsive to the acquired image being captured with a flash, regions of the acquired image may be analyzed corresponding to the tracked candidate face regions for red-eye defects. Red-eye defects may be corrected in the acquired image. Indications of red eye defects may be stored with the acquired image.

A method of detecting faces in an image stream using a digital image acquisition device is also provided. An acquired image is received from an image stream including one or more face regions. The acquired image is sub-sampled at a specified resolution to provide a sub-sampled image. One or more regions of the acquired image may be identified as candidate face regions. A corresponding integral image for a least one of the candidate face regions of the sub-sampled acquired image may be analyzed. Face detection may be applied to a portion of the integral image to provide a set of one or more candidate face regions each having a given size and a respective location. For at least one candidate face region associated with a previous image, the contrast of the luminance characteristics of the corresponding region of the acquired image is enhanced.

The identifying may be performed on the sub-sampled image, and/or face detection may be performed with relaxed face detection parameters. The enhancing may be performed on the sub-sampled image and/or during calculation of the integral image. In a face detection mode of a digital image acquisition device, each new acquired image may be acquired with progressively increased exposure parameters until at least one candidate face region is detected.

An image processing apparatus includes one or more processors and one or more digital storage media having digitally-encoded instructions embedded therein for programming the one or more processors to perform any of the methods described herein for detecting, recognizing and/or tracking faces in an image stream.

Alternatively, or in addition, the user can manually deselect regions that were wrongly false detected as faces. Such selection can be due to the fact that a face was false detected or when the photographer may wish to concentrate on one of the faces as the main subject matter and not on other faces. Alternatively, the user may re-select, or emphasize one or more faces to indicate that these faces have a higher importance in the calculation relative to other faces. This process may be used to further define a preferred identification process to be a continuous value one as opposed to a binary one. The process can be done utilizing a visual user interface or by adjusting the sensitivity of the detection process. After the faces are correctly isolated, their attributes may be compared to default values that may have been predefined. Such comparison will determine a potential transformation between the two images, in order to reach the same values. The transformation is then translated to the device rendering parameters, and the image is rendered. The process may include a plurality of images. In this case, the process repeats itself for each image prior to performing the rendering process. A practical example is the creation of a thumbnail or contact sheet which is a collection of low resolution images, on a single display instance.

A method of in-camera processing of a still image is also provided including one or more faces as part of an acquisition process. A group of pixels is identified that corresponds to a face within a digitally-acquired still image on a portable camera. A collection of low resolution images including the face may be generated in-camera, captured or otherwise obtained in-camera. The face is tracked within the collection of low resolution images. A first processing portion of the image may be determined including the group of pixels based on the collection of low resolution images. A second processing portion of the image other than the group of pixels may also be determined. Automatic in-camera processing may be performed on the first processing portion with enhanced quality processing or otherwise separately compared with the second processing portion to generate a processed image including the face.

Another method is provided for in-camera processing of a still image including one or more faces as part of an acquisition process. A group of pixels is identified that corresponds to a face within a digitally-acquired still image on a portable camera. A collection of low resolution images including the face is generated in-camera, captured or otherwise obtained in-camera. The face is tracked within the collection of low resolution images. Information is gathered regarding the face from the collection of low resolution images. An automatic determination of in-camera processing is based on the information gathered regarding the face from the collection of low resolution images. A processed version of the still image including the face is based on the determining. The in-camera processed version of the still image including said face is output to a digital rendering device for viewing.

The second processing portion may be deemed background while the first processing portion may be deemed foreground. It may be determined that the foreground should be optimally exposed, focused, and white and color-balanced, as well as preferably sharp, while the background may be blurred and not as optimally exposed, focused nor white- nor color-balanced as the foreground. The background may be intentionally blurred.

In-camera processing may be include performing adjustable image resolution. The enhanced quality processing may vary between groups of pixels that correspond to different faces. The enhanced quality processing may include a function of one or more parameters including the relative size of the face, location of the face, exposure of the face, and/or total of faces detected in the image.

An automatically provided option for in-camera processing of the first processing portion with enhanced quality processing compared with the second processing portion may be provided. The option may be variable based on a subjective user decision. The option may be determined as a function of one or more parameters including the relative size of the face, location of the face, exposure of the face, and/or total of faces detected in the image, or combinations thereof.

Several embodiments have been described. The present invention is not limited to these embodiments, which may be amended or modified without departing from the scope of the present invention, which is set forth in the appended claims, and also includes structural and functional equivalents thereof.

The invention claimed is:

1. A face detection and recognition method, comprising:
   acquiring, from an image stream, an image including one or more face regions;
   calculating an integral image for at least a portion of the image or a sub-sampled version of the at least a portion of the image, or both;
   applying a face detection to at least a portion of the integral image to provide one or more candidate face regions;
   applying a face recognition, which uses a database, to the one or more candidate face regions to recognize a face in the one or more candidate face regions, and determining an identifier for the recognized face;
   storing the identifier for the recognized face in association with the image or a portion thereof that includes the recognized face; and
   adjusting one or more image acquisition conditions in an image acquiring device to modify white balance, color balance, focus, or exposure, or combinations thereof, for the recognized face.

2. The method of claim 1, further comprising applying a face tracking to detect the recognized face from another image of the image stream.

3. The method of claim 1, wherein the database includes an identifier and one or more associated parameters for each of one or more faces to be recognized.

4. The method of claim 1, wherein the applying the face recognition is performed selectively, and the method further comprises selecting the one or more candidate face regions having a frontal alignment for the face recognition or including two eye regions and a mouth region within a given area of the candidate face region, or both.

5. The method of claim 1, further comprising providing a level of confidence for each candidate face region based on the face detection, and wherein a candidate face region is designated with a first level of confidence as a face region, and wherein the face recognition is applied to the candidate face regions having a second confidence level higher than the first level of confidence.

6. The method of claim 1, further comprising applying an Active Appearance Model (AAM) to the one or more candidate face regions, and applying the face recognition to the one or more candidate face regions having AAM parameters indicating the candidate face region that has a degree of rotation within a pre-determined range.

7. The method of claim 1, further comprising applying chain classifiers to the image, wherein at least one of the chain classifiers includes a frontal classifier chain, and applying the face recognition to the one or more candidate face regions detected with the frontal classifier chain.

8. The method of claim 1, further comprising calculating an average luminance for each candidate face region, and applying the face recognition to the one or more candidate face regions having the average luminance within a pre-determined range.

9. The method of claim 1, wherein the image received from the image stream comprises a relatively low resolution preview image.

10. The method of claim 9, further comprising determining a subsequent location or a subsequent size, or both, for the same face in a subsequent preview image; and based on an initial location or an initial size and the subsequent location or size, or combinations thereof, predicting a region of a third preview image which has just been acquired within which region the same face is expected to occur again.

11. A digital image acquisition device, comprising a lens, an image sensor, a processor, and a processor-readable memory having digital code embedded therein for programming the processor to perform a method of detecting and recognizing faces in digital images acquired by the device, wherein the method comprises:
   acquiring, from an image stream, an image including one or more face regions;
   calculating an integral image for at least a portion of the image or a sub-sampled version of the at least a portion of the image, or both;
   applying a face detection to at least a portion of the integral image to provide one or more candidate face regions;
   applying a face recognition, which uses a database, to the one or more candidate face regions to recognize a face in the one or more candidate face regions, and determining an identifier for the recognized face;
   storing the identifier for the recognized face in association with the image or a portion thereof that includes the recognized face; and
   adjusting one or more image acquisition conditions in an image acquiring device to modify white balance, color balance, focus, or exposure, or combinations thereof, for the recognized face.

12. The device of claim 11, wherein the method further comprises applying a face tracking to detect the recognized face from another image of the image stream.

13. The device of claim 11, wherein the database includes an identifier and one or more associated parameters for each of one or more faces to be recognized.

14. The device of claim 11, wherein the applying the face recognition is performed selectively, and the method further comprises selecting the one or more candidate face regions having a frontal alignment for the face recognition or including two eye regions and a mouth region within a given area of the candidate face region, or both.

15. The device of claim 11, further comprising providing a level of confidence for each candidate face region based on the face detection, and wherein a candidate face region is designated with a first level of confidence as a face region, and wherein the face recognition is applied to the candidate face regions having a second confidence level higher than the first level of confidence.

16. The device of claim 11, further comprising applying an Active Appearance Model (AAM) to the one or more candidate face regions, and applying the face recognition to the one or more candidate face regions having AAM parameters indicating the candidate face region that has a degree of rotation within a pre-determined range.

17. The device of claim 11, further comprising applying chain classifiers to the image, wherein at least one of the chain classifiers includes a frontal classifier chain, and applying the face recognition to the one or more candidate face regions detected with the frontal classifier chain.

18. The device of claim 11, further comprising calculating an average luminance for each candidate face region, and applying the face recognition to the one or more candidate face regions having the average luminance within a pre-determined range.

19. The device of claim 11, wherein the image received from the image stream comprises a relatively low resolution preview image.

20. The device of claim 19, further comprising determining a subsequent location or a subsequent size, or both, for the same face in a subsequent preview image; and based on an initial location or an initial size and the subsequent location or size, or combinations thereof, predicting a region of a third preview image which has just been acquired within which region the same face is expected to occur again.

21. One or more non-transitory processor-readable storage media having code embedded therein for programming a processor to perform a method of detecting and recognizing faces in digital images received from an image stream that include one or more face regions, the method comprising:
   calculating an integral image for at least a portion of a digital image or a sub-sampled version of the at least a portion of the image, or both;
   applying a face detection to at least a portion of the integral image to provide one or more candidate face regions;
   applying a face recognition, which uses a database, to the one or more candidate face regions to recognize a face in the one or more candidate face regions, and determining an identifier for the recognized face;
   storing the identifier for the recognized face in association with the image or a portion thereof that includes the recognized face; and
   adjusting one or more image acquisition conditions in an image acquiring device to modify white balance, color balance, focus, or exposure, or combinations thereof, for the recognized face.

22. The one or more processor-readable storage media of claim 21, wherein the method further comprises applying a face tracking to detect the recognized face from another image of the image stream.

23. The one or more processor-readable storage media of claim 21, wherein the database includes an identifier and one or more associated parameters for each of one or more faces to be recognized.

24. The one or more processor-readable storage media of claim 21, wherein the applying the face recognition is performed selectively, and the method further comprises selecting the one or more candidate face regions having a frontal alignment for the face recognition or including two eye regions and a mouth region within a given area of the candidate face region, or both.

25. The one or more processor-readable storage media of claim 21, further comprising providing a level of confidence for each candidate face region based on the face detection, and wherein a candidate face region is designated with a first level of confidence as a face region, and wherein the face recognition is applied to the candidate face regions having a second confidence level higher than the first level of confidence.

26. The one or more processor-readable storage media of claim 21, further comprising applying an Active Appearance Model (AAM) to the one or more candidate face regions, and applying the face recognition to the one or more candidate face regions having AAM parameters indicating the candidate face region that has a degree of rotation within a pre-determined range.

27. The one or more processor-readable storage media of claim 21, further comprising applying chain classifiers to the image, wherein at least one of the chain classifiers includes a frontal classifier chain, and applying face recognition to the one or more candidate face regions detected with the frontal classifier chain.

28. The one or more processor-readable storage media of claim 21, further comprising calculating an average luminance for each candidate face region, and applying the face recognition to the one or more candidate face regions having the average luminance within a pre-determined range.

29. The one or more processor-readable storage media of claim 21, wherein the image received from the image stream comprises a relatively low resolution preview image.

30. The one or more processor-readable storage media of claim 29, further comprising determining a subsequent location or a subsequent size, or both, for the same face in a subsequent preview image; and based on based on an initial location or an initial size and the subsequent location or size, or combinations thereof, predicting a region of a third preview image which has just been acquired within which region the same face is expected to occur again.

* * * * *